(12) United States Patent
Negri

(10) Patent No.: US 6,397,568 B1
(45) Date of Patent: Jun. 4, 2002

(54) APPARATUS WITH HELICAL BLADES FOR CUTTING GRASS AND THE LIKE, HITCHED TO THE FRONT OF A MOTOR UNIT

(75) Inventor: Maurizio Negri, Gonzaga (IT)

(73) Assignee: Officine Bieffebi S.r.l., Gonzaga (IT)

( * ) Notice: Subject to any disclaimer, the term of this patent is extended or adjusted under 35 U.S.C. 154(b) by 0 days.

(21) Appl. No.: 09/707,798

(22) Filed: Nov. 8, 2000

(30) Foreign Application Priority Data

Nov. 10, 1999 (IT) .......................................... MI99A2349

(51) Int. Cl.⁷ .............................................. A01D 34/62
(52) U.S. Cl. .............................................. 56/7; 56/249
(58) Field of Search ........................ 56/6, 7, 13.6, 13.9, 56/15.1, 15.2, 253, 294, 249, DIG. 9, DIG. 11, DIG. 14

(56) References Cited

U.S. PATENT DOCUMENTS

| | | |
|---|---|---|
| 1,614,333 A | 1/1927 | Worthington |
| 2,699,957 A | 1/1955 | White |
| 2,936,561 A | 5/1960 | Grimes |
| 5,293,729 A | 3/1994 | Curry et al. |
| 5,459,984 A | * 10/1995 | Reichen et al. ................... 56/7 |
| 5,623,817 A | 4/1997 | Bricko et al. |
| 5,628,169 A | * 5/1997 | Stiller et al. ..................... 56/7 |
| 6,082,086 A | * 7/2000 | Togoshi et al. ................ 56/199 |
| 6,131,378 A | * 10/2000 | Lees ............................... 56/7 |

FOREIGN PATENT DOCUMENTS

EP         0856247 A        8/1998

* cited by examiner

Primary Examiner—Robert E. Pezzuto
(74) Attorney, Agent, or Firm—Birch, Stewart, Kolasch & Birch, LLP

(57) ABSTRACT

An apparatus for cutting grass is provided which is capable of being attached to a motor unit (1,1*a*) and comprising a carriage (30) having a shaft (31) supporting associated wheels (32) and helical blades (33) rotating about the shaft (31), at least one support frame (10) including a pin (12) having a rotational axis substantially perpendicular to the ground to be cut, pin (12) having mounted thereon a first end (20*a*) of an arm (20) which is substantially parallel to the ground, a second end (20*b*) thereof pivotably mounted on the carriage (30) that is supported by the arm (20) so that the end (20*a*) of the arm (20) mounted on pin (12) is in front of shaft (31) of the carriage (30) in the direction of forward movement of the apparatus.

12 Claims, 2 Drawing Sheets

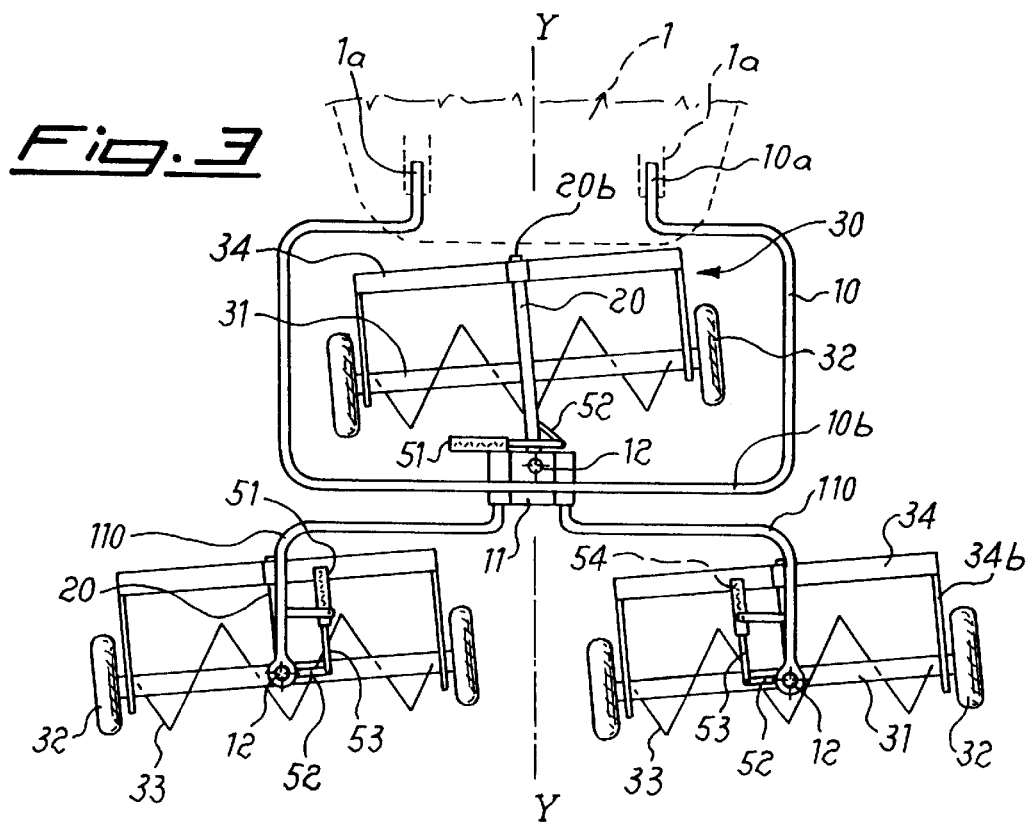
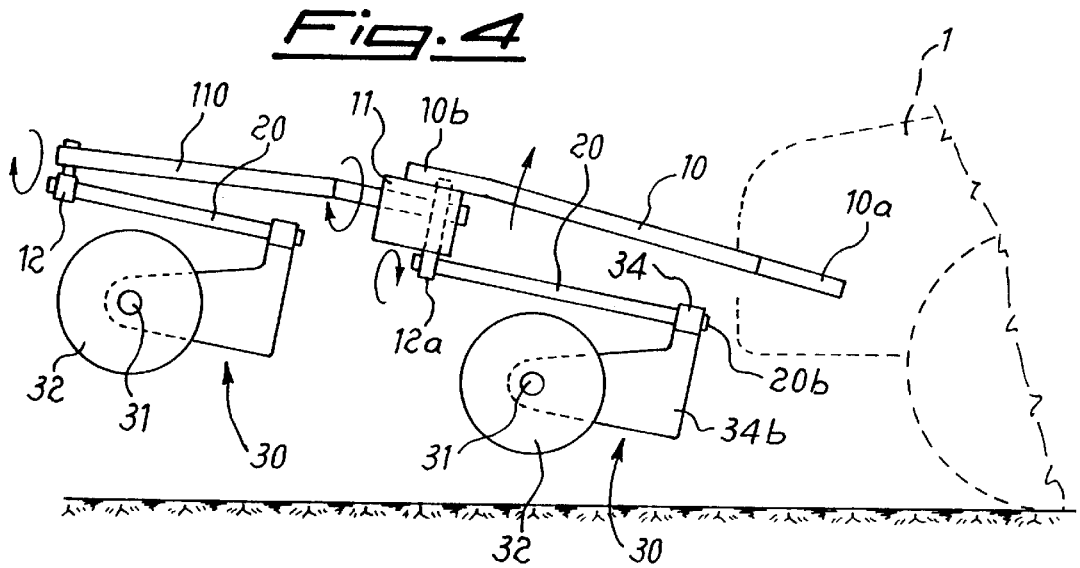

APPARATUS WITH HELICAL BLADES FOR CUTTING GRASS AND THE LIKE, HITCHED TO THE FRONT OF A MOTOR UNIT

BACKGROUND OF THE INVENTION

The present invention relates to an apparatus for cutting grass and the like, which can be hitched in front of a motor unit.

In the technical sector relating to the cutting of grass, cutting devices with helical blades are known, said devices being substantially in the form of carriages formed by a plurality of helically twisted blades which are arranged around a rotating shaft mounted on wheels and which rotate integrally therewith as a result of driving of the carriage produced by the operator either manually or by means of special motor units to which the carriages are attached in the manner of a trailer.

It is also known that the cutting of grass with trailer devices gives rise to problems in that the motor unit, passing before the blades, crushes the grass and makes cutting more difficult; in addition, it is more difficult to perform visual control of the cutting direction and operation of the blades which require long stretches of ground in order to be able to straighten up after a bend, thereby complicating the manoeuvres and basically preventing the use of the devices in small plots such as gardens and the like.

It has therefore been attempted arranging the helical-blade carriages in position in front of the motor unit, but, since it is not possible to take advantage of the towing effect, it has been necessary to provide the said carriages with auxiliary motor means, separate from the motor unit, for operation of the blades, with a consequent increase in the technical design difficulties, the installation and management costs and maintenance requirements.

The technical problem which is posed, therefore, is that of providing an apparatus for cutting grass, with helical-blade devices, which can be hitched in front of special motor units without the need for auxiliary motors for operating the blades.

Within the scope of this problem a further requirement is that the apparatus should have small dimensions, allow easy operation and preferably be provided with means for rapid return of the blades into a position of alignment with the longitudinal axis of the motor unit after cutting along a section which is not straight.

These technical problems are solved according to the present invention by an apparatus for cutting grass which can be hitched to a motor unit and comprises a carriage with a shaft carrying associated wheels and helical blades rotating about said shaft, which apparatus comprises at least one support frame to which a rotational pin substantially perpendicular to the ground to be cut is attached, said vertical pin having, connected to it, a first end of an arm which is substantially parallel to the ground, the other end thereof being pivotably mounted on the carriage so that the end of the arm connected to the frame is in a position in front of the shaft of the carriage in the direction of forward movement of the apparatus.

Further details may be obtained from the following description of a non-limiting example of embodiment provided with reference to accompanying drawings, in which:

BRIEF DESCRIPTION OF THE DRAWINGS

FIG. 3 shows a top plan view, similar to that of FIG. 1, during steering of the apparatus;

FIG. 4 shows a side view of the apparatus raised so as to allow the rapid return of the wheels into the straight position and/or transportation in non-operative conditions.

DETAILED DESCRIPTION OF THE INVENTION

Figure 1:
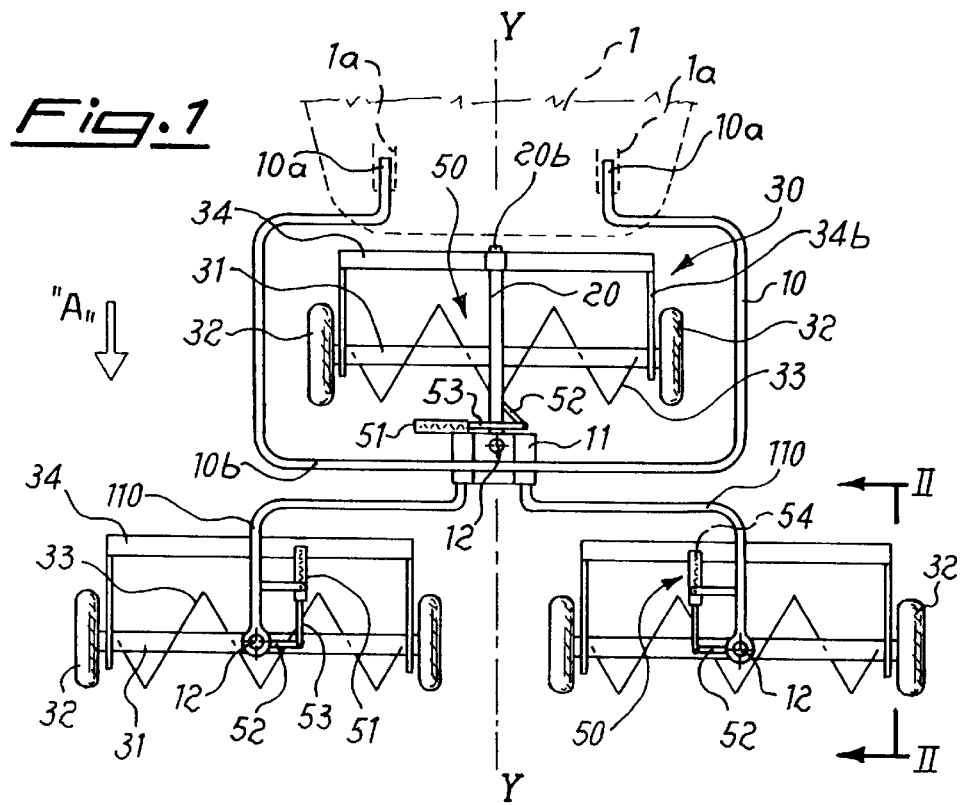
FIG. 1 shows a top plan view of the apparatus according to the invention hitched in front of a motor unit.

As illustrated in FIG. 1, the apparatus according to the invention is composed of a support frame 10 substantially in the form of a "U", the free ends 10a of which are engaged in corresponding seats 1a of the motor unit 1 which is shown only in broken lines, said seats being able to be operated so as to raise/lower the frame 10 towards/away from the ground.

A flange 11, which houses a pin 12 perpendicular to the ground, is arranged along a section of the frame 10b which is transverse with respect to the longitudinal axis Y-Y of the motor unit.

Figure 2:
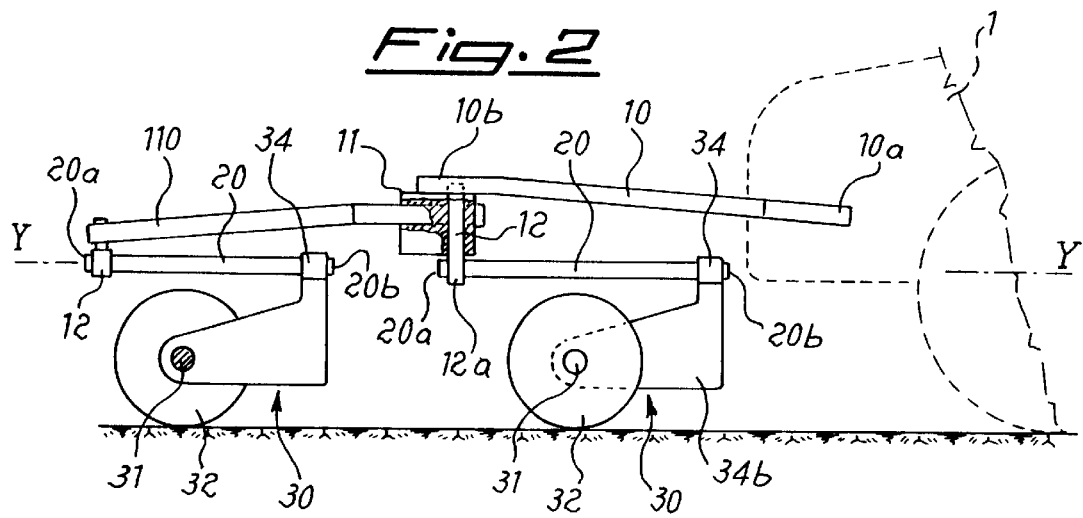
FIG. 2 shows a cross-section along the plane indicated by II—II in FIG. 1.

The first end 20a of an arm 20 arranged substantially parallel to the ground is in turn connected to the bottom 12a of said pin 12 (FIG. 2), the opposite end 20b of said arm being pivotably mounted on a transverse bar 34, the ends 34b of which are pivotably mounted on the carriage 30 forming the actual cutting element.

Said carriage 30 consists of a horizontal shaft 31, at the opposite ends of which wheels 32 are mounted and around which the helical blades 33 are arranged, said shaft being known per se and not requiring further description.

It can therefore be understood how the carriage 30 has two degrees of freedom, being able to rotate about an axis 12 perpendicular to the ground, for steering manoeuvres, and about an axis 20 parallel to the ground, so as to be able to follow the undulations of the ground and overcome any obstacles which are encountered during the forward movement.

The carriage 30 also has a further degree of freedom, consisting precisely of the possibility of rotation of the cross-piece 34 about the shaft 31.

With this configuration, the frame 10 is pushed by the motor unit 1, while the carriage 30 is drawn by the arm 20 which, having its point of attachment 20a in front of the carriage shaft 31, restores the conditions for towing of said carriage which consequently does not require its own means for actuation of the blades 33 and can be freely steered with the same radii of curvature as a trailer arrangement.

In a preferred embodiment, the apparatus according to the invention also has a device 50 for recalling the shaft 31 of the carriage.

Said device 50 is of the double-acting type and has a fixed casing 51 with an intermediate point 51a of attachment to the support frame 10 and a coaxial internal slider 53, one end of which is pivotably mounted on a lever 52 which is in turn hinged on the vertical pin 12; a spring 54 is arranged coaxial with the slider 53 and is compressed in either direction by the action of the slider 53 depending on the direction of displacement of the latter.

The slider 53 is therefore able to be displaced in both directions against the recall action of the spring 54 and this allows rotation of the shaft 31 about the vertical pin 12 to be stabilised so that both steering of the carriage and maintaining the direction during travel is made easier and more precise.

The recall device 50 has, however, another important function which is that of allowing rapid return of the wheels 32 into alignment with the longitudinal direction Y-Y of the motor unit at the end of cutting of a curved section; by raising, in fact, the seats 1*a* and therefore the frame 10, the carriage 30 is also raised and is free to rotate into the position of alignment owing to the recall action of the spring 54 on the slider 53; in this way it is possible to straighten the carriage 30 and therefore the cutting blades 31 without the need for driving contact on the ground.

By lowering again the frame 10 with the blades already straight, it is therefore avoided starting cutting again in a crooked manner as occurs with the devices of the known art.

In order to increase the cutting area of the apparatus, it is envisaged providing several successive rows in front of each other with an increasing number of carriages for each row in the direction of forward movement A.

For this purpose, said flange 11 integral with the frame 10 is formed so as to have two tubular seats 11*b*, each of which is designed to engage with an end 110*a* of a corresponding support 110 which is substantially in the form of a "Z" and arranged so that the other end 110*b* thereof is in a position in front of the associated carriage 30.

As shown, said L-shaped supports are arranged facing each other with respect to the longitudinal axis Y-Y of the machine, so as to leave a distance in the transverse direction between the two ends 110*b* such as to allow insertion of the carriages 30 alongside each other in the transverse direction without restricting the possibility of free steering thereof.

The supports 110 in turn carry a vertical pin 12 on which an arm 20 in accordance with the arrangement described above is pivotably mounted. The additional carriages 30 are also associated with recall devices 50 of the type already described and in this case also the said devices ensure rapid return of the shafts 30 into the zero position since raising of the frame 10 also causes raising of the supports 110 which, freeing the wheels of the associated carriage 30, allow recall thereof by the device 50.

The three carriages 30 are arranged staggered so that cutting performed by the first rear carriage covers the longitudinal strip which is not covered by the front two which are necessarily arranged at a distance from each other in the transverse direction as described above.

What is claimed is:

1. Apparatus for cutting grass, capable of being attached to a motor unit (1,1*a*) and comprising a carriage (30) having a shaft (31) supporting associated wheels (32) and helical blades (33) rotating about said shaft (31), at least one support frame (10) including a pin (12) having a rotational axis substantially perpendicular to the ground to be cut, said pin (12) having mounted thereon a first end (20*a*) of an arm (20) which is substantially parallel to the ground, a second end (20*b*) thereof pivotably mounted on the carriage (30) that is supported by the arm (20) so that the end (20*a*) of the arm (20) mounted on said pin (12) is in front of shaft (31) of the carriage (30) in the direction of forward movement of the apparatus.

2. Apparatus according to claim 1, wherein said support frame (10) has means (10*a*) for connection to parts (1*a*) of the motor unit which can be actuated so as to be raised/lowered.

3. Apparatus according to claim 1, wherein said support frame is U-shaped.

4. Apparatus according to claim 1, comprising means (50) for returning each shaft (31) of the carriage (30) into a position of alignment with the longitudinal axis (Y-Y) of the motor unit (1).

5. Apparatus according to claim 1, comprising a plurality of cutting carriages (30) arranged in front of the first carriage in the direction of forward movement.

6. Apparatus according to claim 5, further comprising flange (11) for coupling with corresponding supports (110) of the additional carriages (30) and integrally joined to said frame (10).

7. Apparatus according to claim 6, wherein said flange (11) is coupled with said corresponding supports (110) by means of a hinge coupling having an axis of rotation substantially parallel to the ground.

8. Apparatus according to claim 6, wherein said supports are Z-shaped.

9. Apparatus according to claim 6, wherein pin (12) with an axis substantially perpendicular to the ground is positioned at the front free end of each support (110).

10. Apparatus according to claim 9, wherein first end (20*a*) of an arm (20) substantially perpendicular to the ground is connected to said pin (12), the other end thereof (20*b*) being pivotably mounted on the carriage (30) so that the end of the arm (20) connected to the frame (10) is in a position in front of the shaft (31) of the carriage (30) in the direction of forward movement of the apparatus.

11. Apparatus according to claim 4 wherein said return means comprises a double-acting device (50) comprising an external casing (51) fixed to the respective frame/support (10,110) and an internal slider (53), one end of which is attached to lever (52) connected to pin (12).

12. Apparatus according to claim 11, wherein said recall means comprises a spring (54) coaxially arranged around said slider (53) and adapted to be compressed in either direction depending on the direction of displacement of the said slider (53).

* * * * *